US006892997B2

(12) United States Patent
Kreuter

(10) Patent No.: US 6,892,997 B2
(45) Date of Patent: May 17, 2005

(54) METHOD AND VALVE FOR REDUCING VALVE OPENING AND CLOSING TIME DURATIONS

(75) Inventor: Peter Kreuter, Aachen (DE)

(73) Assignee: META Motoren- und Energie-Technik GmbH (DE)

(*) Notice: Subject to any disclaimer, the term of this patent is extended or adjusted under 35 U.S.C. 154(b) by 94 days.

(21) Appl. No.: 10/369,518

(22) Filed: Feb. 21, 2003

(65) Prior Publication Data

US 2003/0213930 A1 Nov. 20, 2003

(30) Foreign Application Priority Data

Feb. 22, 2002 (DE) .......................................... 102 07 658

(51) Int. Cl.[7] .............................................. F16K 31/02
(52) U.S. Cl. .................. 251/129.16; 123/337; 137/219; 251/212; 251/129.22; 251/298
(58) Field of Search ........................ 251/129.16, 129.22, 251/129.04, 332, 212, 298; 123/90.11, 337, 399; 137/219

(56) References Cited

U.S. PATENT DOCUMENTS

| 258,500 | A | * | 5/1882 | Storer .................... 251/129.09 |
| 948,361 | A | * | 2/1910 | Webb, Jr. .................... 137/347 |
| 1,415,374 | A | | 5/1922 | Lovejoy |
| 2,922,614 | A | * | 1/1960 | Nickells .................. 251/129.22 |
| 4,106,466 | A | | 8/1978 | Goloff .......................... 123/188 |
| 4,137,933 | A | * | 2/1979 | Culpepper .................... 137/219 |
| 4,167,262 | A | * | 9/1979 | Lemmon ......................... 251/63 |
| 4,305,418 | A | * | 12/1981 | Jensen et al. ................ 137/219 |
| 4,424,825 | A | * | 1/1984 | Hanson .................. 251/129.16 |
| 4,838,518 | A | * | 6/1989 | Kobayashi et al. .... 251/129.16 |
| 4,925,155 | A | * | 5/1990 | Carman .................. 251/129.22 |
| 5,618,025 | A | * | 4/1997 | Barron et al. ................ 251/210 |
| 6,076,803 | A | * | 6/2000 | Johnson et al. ......... 251/129.22 |
| 6,247,432 | B1 | * | 6/2001 | Pischinger et al. ...... 123/90.11 |
| 6,260,521 | B1 | * | 7/2001 | Kirschbaum ............. 123/90.11 |
| 6,637,405 | B2 | * | 10/2003 | Kreuter ....................... 123/337 |

FOREIGN PATENT DOCUMENTS

| CH | 366422 | 2/1963 | |
| DE | 7413037 | 4/1974 | |
| DE | 30 17 471 | 11/1980 | ............. F02D/9/02 |
| DE | 37 37 824 C2 | 2/1991 | ............. F02D/9/08 |
| DE | 36 30 233 C2 | 10/1992 | ............. F02D/9/00 |
| DE | 41 41 063 A1 | 6/1993 | ............. F02F/1/42 |
| DE | 195 00 501 | 1/1996 | ............. F01L/1/00 |
| DE | 100 32 669 A1 | 1/2002 | ............. F02D/9/02 |
| DE | GEB 101 33 942 A1 | 1/2002 | ............. F02D/9/02 |

* cited by examiner

*Primary Examiner*—John Bastianelli
(74) *Attorney, Agent, or Firm*—Stevens, Davis, Miller & Mosher, LLP

(57) ABSTRACT

A process reducing the side opening and closing time of a valve. The process uses a valve for mounting in an intake port of a reciprocating engine upstream from a charge changing valve, which valve contains a valve element operating in conjunction with the inner wall of the intake port, and may be moved back and forth between a closed position and an open position. The valve in the closed position blocks passage of fluid through the port and when in the open position, clears such passage. The valve is characterized in that the inner wall of the port and the valve element are of a design such that when the valve element is moved from its closed position the opening cross-section initially does not increase at all or increases only slowly and then increases rapidly and when the valve element is moved from its open position the opening cross-section initially does not decrease at all or decreases only slowly and then decreases rapidly.

24 Claims, 2 Drawing Sheets

METHOD AND VALVE FOR REDUCING VALVE OPENING AND CLOSING TIME DURATIONS

BACKGROUND OF THE INVENTION

Figure 1:
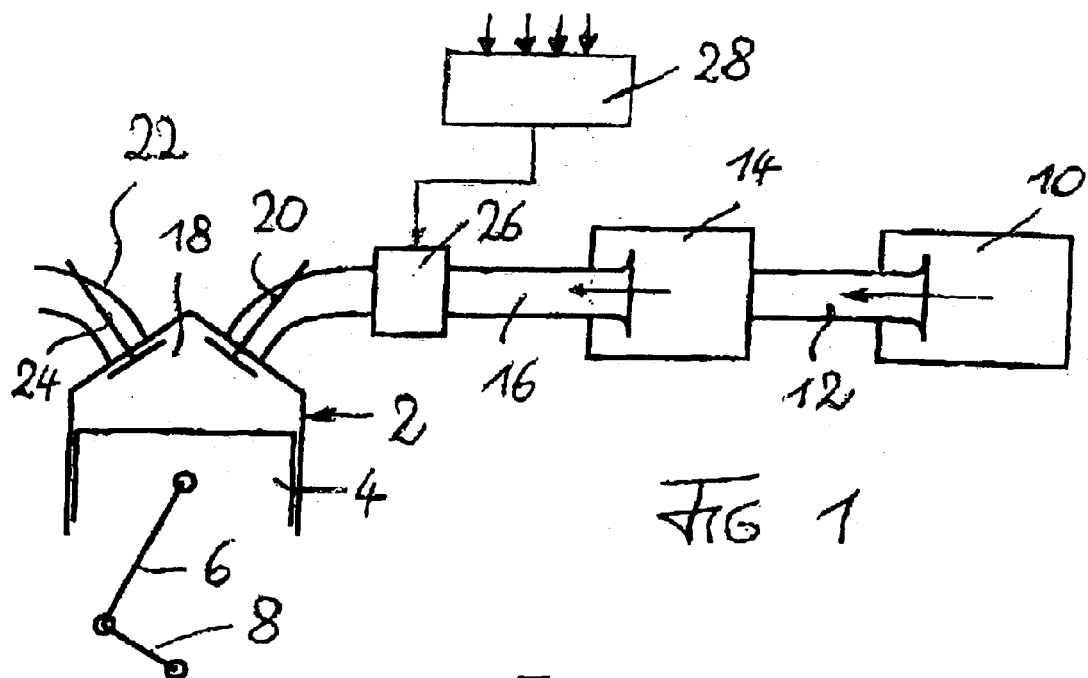

The invention relates to a method for reducing valve opening and closing time durations for a valve that is mounted upstream from a charge changing (intake) valve in an intake duct of a reciprocating engine. The invention also relates to a valve to be mounted in an intake duct of a reciprocating engine upstream from a charge changing valve.

Mounting in the intake port of a reciprocating engine, upstream from an intake valve, of an additional valve which remains closed during the intake stroke of the piston with the intake valve open, so that a high negative pressure is built up downstream from the additional valve, is known in the prior art. If the additional valve is then opened, high impetus is imparted to the fresh charge admitted because of the negative pressure, as a result of which the filling of the combustion chamber is increased and greater torque is achieved. It is advantageous for numerous applications if the switching times, that is, the period of time within which the opening cross-section of a fluid channel controlled by a valve element of the additional valve is fully opened or closed, is as short as possible.

Reducing the switching times of valves entails considerable expense if the valve element is not permanently in motion, for example, in rotary motion in the case of a rotary slide valve. Even if the valve element is part of a mechanical oscillator kept in its end positions by electromagnets, limits are imposed on the switching times, since neither can the weight of the oscillator, because of considerations of strength, density, and cost, be lowered optionally as greatly as possible, nor can the spring rigidity, because of considerations of weight and cost, be optionally increased as greatly as possible nor can the retaining power of the electromagnet, because of considerations of space and energy requirements, be increased excessively.

DE 195 90 501, the independent claims presented in the preambles of which are taken as the basis, discloses a valve with a valve flap (valve element) mounted in the intake port of a reciprocating engine upstream from a charge changing valve which is hinge-connected by linkage to a bar rigidly connected to an armature, which armature is pretensioned in a central position between two electromagnets by two springs. When in contact with an electromagnet the valve flap is in its full open position, in which it is oriented toward the longitudinal center of the intake port. When the armature is in contact with the electromagnet the valve flap is in its closed position, in which it closes off the cross-section of the intake port. During the end portion of movement of the valve flap into its closed position or from its closed position, the edge of the valve flap moves along a suitably shaped recess in the interior wall of the intake port, so that the valve opening cross-section cleared by the valve flap changes only if the valve flap has passed over the edge of the recess or a control edge formed there. The result achieved is that the change in the valve opening cross-section at the beginning of opening of the valve and at the end of closing of the valve takes place very rapidly, so that precise control times may be established for commencement of opening and completion of opening.

SUMMARY OF THE INVENTION

A first solution of the problem formulated for the invention is achieved by a process for reducing a side opening and/or closing time of a valve mounted in an intake port of a reciprocating engine upstream from a charge changing valve a valve element of which may be moved by a drive independent of the charge changing valve from a closed position in which it closes a valve opening formed by an inner wall of the intake port into an open position in which the valve opening is cleared for passage of fluid, and conversely, characterized in that passage is not cleared or is cleared very little over a first part of the movement of the valve element from the closed position and/or is not restricted or is restricted very little over a first part of the movement of the movement of the valve element from the open position.

In the process claimed for the invention the effective opening cross-section of the valve remains unchanged both during the completion of the valve closing movement and during completion of its opening movement. This eliminates the effect both of acceleration of the valve element at the beginning of its respective movement and of deceleration of the valve element at the end of its respective movement. At the point in time at which change in the valve opening cross-section begins or ends, the valve element is in each instance in rapid movement, as a result of which, on the one hand, uncontrolled effects of acceleration and of deceleration are eliminated, and on the other, shorter switching times are possible.

One advantage obtained with the characteristics of preferred valves lies in the fact that the impact of the valve element or an anchor plate actuated by electromagnets, with the anchor connected to the valve element, on any particular bearing surface which defines the particular end position is dampened by the operation of the valve element in conjunction with the design of the limits of the intake duct and/or the valve element for initially keeping the valve opening cross-section constant so that the impact problem arising with electromagnetic oscillating systems, which also leads to acoustic problems, is diminished.

The invention may be applied wherever valves with the shortest possible effective opening and/or closing times are to be employed.

Figure 2:
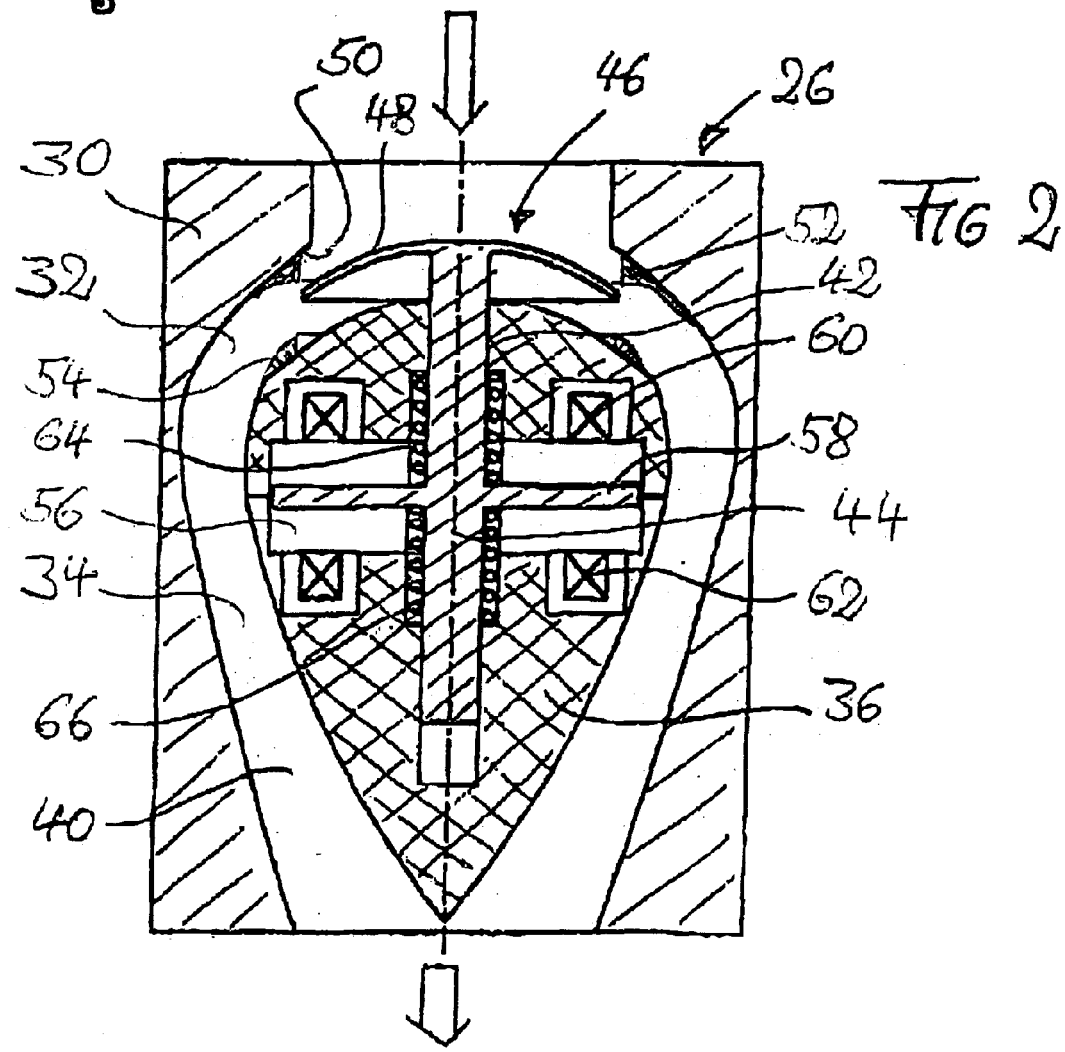
Figure 3:
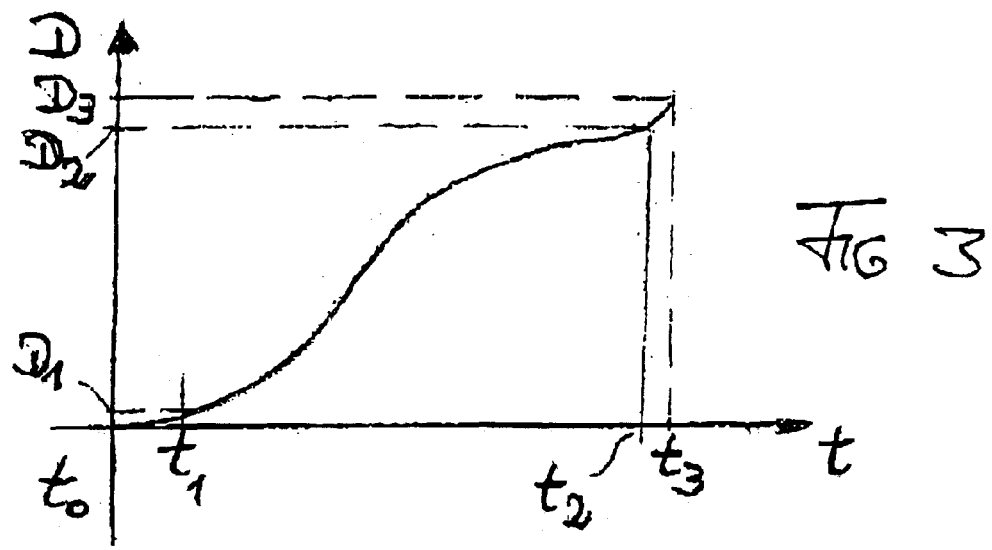
Figure 4:
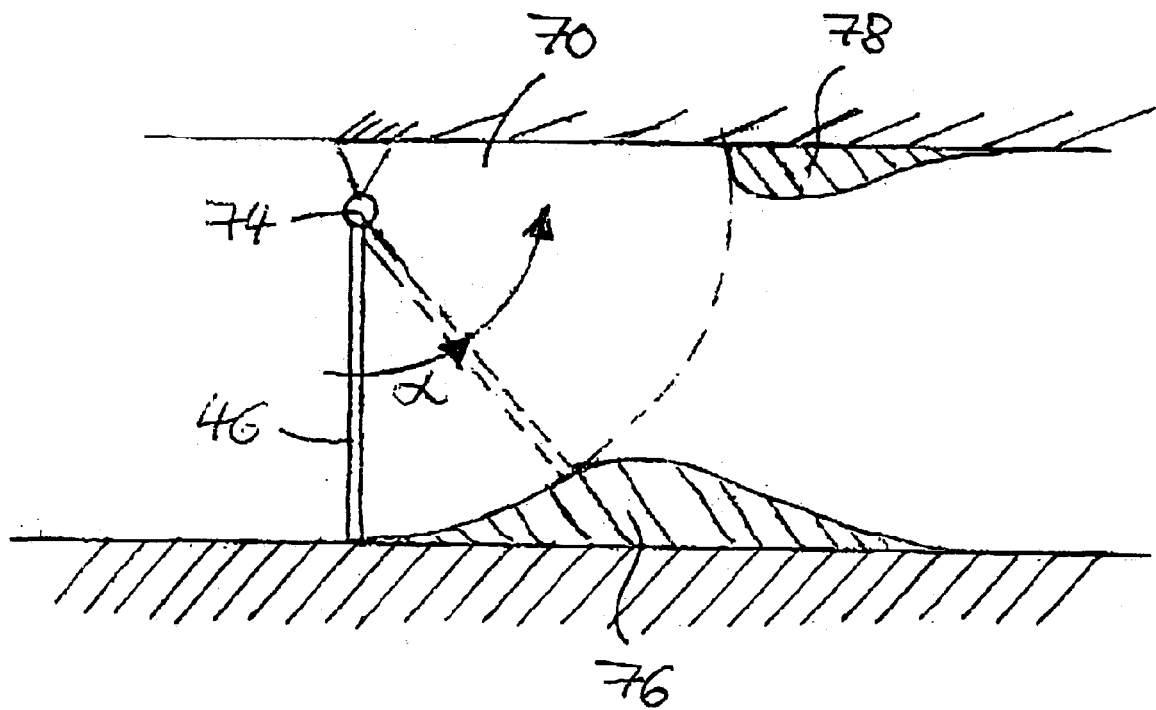

The invention is described in what follows in greater detail with reference to schematic drawings, in which FIG. 1 is a diagrammatic view of a cylinder of a reciprocating engine including certain components of the intake system, FIG. 2 a longitudinal section through a first embodiment of a valve as claimed for the invention, FIG. 3 a curve illustrating the operation of the valve, and FIG. 4 a longitudinal section through a modified embodiment of a valve. drawings, in which FIG. 1 shows a reciprocating engine having a plurality of cylinders 2 in each of which cylinders operates a piston 4 that is connected to a crankshaft 8 by a connecting rod 6. Fresh air or fresh boost air is fed to the cylinder 2 through an air filter 10 which is connected by a feed line 12 to an air collector 14. Intake ducts 16 extend from the air collector 14 to the combustion chamber 18 of each cylinder 2. At least one intake valve 20 is mounted in the orifice of each intake duct 16, thereby discharging fresh air into the combustion chamber 18. At least one outlet valve 24 operates downstream from an exhaust channel 22 connected to the combustion chamber 18. The present configuration of the intake system is advantageous but not absolutely necessary.

An additional valve 26 is controlled by a control device 28 and is provided in the intake duct 16 upstream from the intake valve 20, which serves as a charge changing valve.

An additional valve 26 the operation of which is controlled by a control device 28 is provided in the intake port 16 upstream from the intake valve 20 serving as charge changing valve.

The operation of the configuration described, including mixture preparation, etc., is of the state of the art and will consequently not be discussed in detail.

FIG. 2 presents a longitudinal section through the valve 26 illustrated in FIG. 1. Arrows indicate the direction of air or fresh charge flow.

The intake port 16 is widened at the upstream end of the valve 26, while the inner wall of an intake port element 30 has an area 32 tapering outward which immediately beyond the widest point effects transition to a narrowing area 34 which finally makes a smooth transition to the part of the intake port 16 leading to the intake valve 20 (not shown).

Mounted in the widening area 32 and the adjoining narrowing area 34 is an overall streamlined flow element 36 which is retained in the intake port element 30 by means of mounting elements (not shown), which also promote flow.

The flow element 36 is configured to be adapted to the inner wall of the intake port element 30 so that there is formed between it and the intake port element 30 an circular gap 40 with annular opening cross-section. The flow cross-section of the circular gap 40 may, as is conventional in hydraulic or aerodynamic devices, initially decrease and then slowly increase again.

At its upstream end the flow element 36 has a blind hole 42 which is mounted so as to be coaxial with the axis of flow and accordingly of the entire configuration. The shank 44 of an overall mushroom-shaped valve element 46 is introduced into the blind hole 42 so as to be movable, the cap 48 of the valve element 46 fastened on the shaft 44 being molded and adapted to the outlines of the widening area 32 and of the flow element 36 in such a way that the cap 48 when in its upper, closed, position rests against an interior area of the widening area 32 forming a valve seat 50 so as to effect sealing and when in a lower, open, position against the exterior outline of the flow element 36 suitably adapted to the cap 48. The cap 48 is convex toward the side facing away from the intake valve 20.

Adjoining the valve seat 50 the inner wall of the widening area 32 is provided with a circular shoulder 52 which forms a cylindrical wall radially inward, the interior diameter of which corresponds to the exterior diameter of the cap 48. Similarly, a circular shoulder 54 is molded on the flow element 36 which radially inward forms a cylindrical wall the interior diameter of which corresponds to the exterior diameter of the cap 48.

The flow element 36 as a whole is in two parts and has in its interior a cavity 56 in which an anchor plate 58 formed as one part with the shank 44 or rigidly connected to it may move, the anchor plate 58 operating in conjunction with annular electromagnets 60 and 62 mounted in the annular recesses in the flow element. Resting on both sides of the anchor plate 58 are helical springs 64 and 66 the respective other ends of which rest on opposite surfaces of the flow element 36. The helical springs 64 and 66 place the valve element 46 under tension into a position between its closed position and open position, as is illustrated in FIG. 2.

The valve 26 operates as follows:

On excitation of the electromagnet 62 the valve element 46, if applicable supported by the air flow, is drawn from the central position shown against the force of the spring 66 into its open position, in which the anchor plate 58 rests against the magnet 62, the dimensions of the valve element being such that in this position the cap 48 rests against the flow element. If the electromagnet 62 is deactivated under control of the control device 28, the valve element 46 is moved by the force of the springs 64 and 66 through its central position in the direction of the closed position, in which the anchor plate 58 rests against the other electromagnet 60, the cap 48 in this position resting against the seat 50. The natural frequency of the oscillatory system represented by valve element and springs is preferably higher than the frequency by which the valve must be actuated, so that rapid change between open and closed positions is possible, it being necessary to apply only the retaining power of the magnets and kinetic energy being stored in the springs.

When use is made for pulsed charging for a high torque even at low speeds, the valve 26 remains closed during the intake cycle with the intake valve 20 open and is opened with the intake valve remaining open if a high negative pressure has been built up. A fresh charge flows with high energy into the combustion chamber, as a result of which a filling may be achieved which is greater than if the valve 26 is not used. Especially at low speeds the valve 26 must be closed before the intake valve closes in order to prevent reverse flow of fresh charge into the intake tract upstream from the valve 26. The valve 26 may replace a throttle valve by being actuated in coordination with the intake valve in such a way that only a predetermined small amount of fresh charge reaches the combustion chamber.

The operation of the circular shoulders 52 and 54 is explained in what follows with reference to FIG. 3.

FIG. 3 illustrates an opening movement of the valve element 46, the valve opening cross-section D extending vertically and time t horizontally. It the magnet 60 is deactivated at time $t_0$, the valve element 46, subjected to the action of the springs 64 and 66, begins to move in the direction of its open position. By means of the circular shoulder 52 an effect is achieved such that opening of the valve opening cross-section begins only if the exterior circumference of the cap 48 has moved past the cylindrical inner wall of the circular shoulder 52, that is, at time $t_1$ in the example illustrated.

The movement of the valve element 46 then accelerates further until the element has reached its central position, and is then decelerated by the action of the increasingly compressed spring 66 until the anchor plate 58 reaches the area of the right magnet 62, which draws the valve element into its open position. At time $t_2$ the exterior circumference of the cap 48 overlaps the cylindrical inner wall of the circular shoulder 54, so that the effective opening cross-section is not further enlarged.

As is to be seen in FIG. 3, the duration of opening of the valve 26, that is, the duration of its opening movement or its flank opening, amounts without the circular shoulders to $t_1-t_0$ and that of the effective opening cross-section $D_3$, while with the circular shoulders the effective opening time amounts to $t_2-t_1$ and the effective opening cross-section to $D_2-D_1$. Because of the initially slow movement of the valve element, the time advantage gained by reducing the flank opening outweighs the disadvantage of a slight reduction in the free opening cross-section. The patterns are reversed in the direction of closing.

The movement of the valve element immediately before the fully open position is reached is presented as accelerated in FIG. 3. This acceleration occurs, for example, as a result of the action of the sharply increasing force of the magnet 60. The opening curve is accordingly asymmetric around the central position. The processes are reversed in closing, that is, the movement of the valve element is initially accelerated, then is decelerated, and then if applicable accelerated again into the closed position. Depending on the dimensioning of the springs, any dampening mechanisms which dampen the impact of the valve element and the rigidly connected parts to one seat or stop, the configuration of the magnets, etc., different patterns of the curve shown in FIG. 3 are produced; the curve may extend symmetrically around a center, its pattern may be the same or different in the opening and closing directions, the course of the curve may be braked at the end of a stroke, etc.

The length of the circular projections as measured in the direction of movement of the valve element is always selected as the optimum value meeting the purpose. It is also to be understood that, if it is a matter exclusively of reducing, for example, the period of opening or the opening flank, the circular shoulder 54 may be dispensed with or, conversely, the circular shoulder 52 may be absent if only reduction of the closing flank is involved.

FIG. 4 illustrates application of the invention to a valve the valve element 46 of which is in the form of a flap rotatable about a shaft 74. On the side opposite the shaft 74 the inner wall of the flow channel 70 is designed with a thickening 74 the outline of which follows the path of movement of the valve element 46 in the direction of opening of the valve along an angular area α. The valve element 46 then progressively clears the opening cross-section of the flow channel 70 only if the latter has been rotated through the angle α. Similarly, on the side of the flow channel 70 opposite the thickening 74 a thickening 78 is formed which follows the outline of the path of movement of the valve element 46 during the last part of the opening movement or first part of the closing movement. In the simplest case the flow channel may be rectangular in cross-section. In the case of a round cross-section the thickenings 76, 78 have corresponding outlines. It is to be understood that the thickenings have outlines which promote flow to the greatest extent possible.

The invention may be applied for valves with the greatest possible variety of designs and with the widest possible variety of drives. The effect of the means provided as claimed for the invention, which permit change in a passage cross-section only if a valve element has traveled a specific distance, is the greatest if the movement of the valve over this distance is accelerated. In this way the switching time of a valve is reduced, an "idle stroke" taking place during which no flow cross-section or a sharply reduced such cross-section is cleared. While this idle stroke is being overcome, the valve element is accelerated to its velocity, at which the flow cross-section is then effectively cleared.

The invention as a whole yields the following advantages:

A valve switching time effective from the viewpoint of flow engineering is made independent of the movement of the valve element. Attainable switching times or switching flanks are thereby reduced or loads on components are reduced with the same effective switching times, the energy consumed in operation of the valve element is reduced, and contact forces are lowered.

Additional valves such as are illustrated in FIG. 1 may be used for boosting torque, especially at low engine speeds, to abate load change losses by early closing (throttle valves, free load control), to improve the dynamic behavior especially of engines under load, in exhaust turbocharging, etc.

| List of Reference Numbers | |
| --- | --- |
| 2 | cylinder |
| 4 | piston |
| 6 | connecting rod |
| 8 | crankshaft |
| 10 | air filter |
| 12 | feed line |
| 14 | air collector |
| 16 | intake port |
| 18 | combustion chamber |
| 20 | intake valve |
| 22 | exhaust channel |
| 24 | outlet valve |
| 26 | valve |
| 30 | intake port element |
| 32 | widening area |
| 34 | narrowing area |
| 36 | flow element |
| 40 | circular gap |
| 42 | blind hole |
| 44 | shank |
| 46 | valve element |
| 48 | cap |
| 50 | valve seat |
| 52 | circular shoulder |
| 54 | circular shoulder |
| 56 | cavity |
| 58 | anchor plate |
| 60 | electromagnet |
| 62 | electromagnet |
| 64 | helical spring |
| 66 | helical spring |
| 68 | circular shoulder |
| 70 | flow channel |
| 72 | circular wall |
| 74 | thickening |
| 76 | thickening |
| 78 | thickening |

What is claimed is:

1. A method for reducing valve opening and closing time durations for a valve having a movable valve element, the method comprising:

moving the valve element away from a valve closed position during a first time period, wherein a fluid flow passage cross-sectional area of a valve opening, which is at least partially defined by the valve element and a surrounding valve body, does not change or substantially does not change during the first time period, moving the valve element farther away from the valve closed position during a second time period, wherein the fluid flow cross-sectional area rapidly increases, moving the valve element farther away from the valve closed position into its valve open position during a third time period, wherein the fluid flow cross-sectional area does not change or substantially does not change, thereby achieving the maximum opening area of the fluid flow cross-sectional area at the beginning of the third time period and maintaining said maximum opening area throughout the third time period, moving the valve element away from the valve open position during a fourth time period, wherein the fluid flow passage cross-sectional area does not change or substantially does not change, thereby maintaining the fluid flow cross-sectional area at its maximum opening area during the fourth time period, moving the valve element farther away from the valve open position during a fifth time period, wherein the fluid flow cross-sectional area rapidly decreases during the fifth time period, and moving the valve element farther away from the valve open position into the valve closed position during a sixth time period, wherein the fluid flow cross-sectional area reaches its minimum opening area and does not change or substantially does not change during the sixth time period.

2. A method as in claim 1, wherein the movement of the valve element from the valve closed position and from the valve open position is accelerated during the first time period and at least the beginning of the second time period.

3. A method as in claim 1, wherein the valve element linearly reciprocates within the valve body.

4. A method as in claim 1, wherein the valve element pivots about a point within the valve body.

5. A method as in claim 1, wherein the valve element is arranged and constructed to substantially conform to shoulder portions defined on the valve body at locations corresponding to the valve open position and the valve closed position.

6. A method as in claim 5, wherein the movement of the valve element from the valve closed position and from the valve open position is accelerated during the first time period and at least the beginning of the second time period.

7. A method as in claim 6, wherein the valve element linearly reciprocates within the valve body.

8. A method as in claim 6, wherein the valve element pivots about a point within the valve body.

9. A method as in claim 6, wherein the fluid flow cross-sectional area does not change during the first, third, fourth and sixth time periods.

10. A method as in claim 1, wherein the fluid flow cross-sectional area does not change during the first, third, fourth and sixth time periods.

11. A method as in claim 1, wherein the valve is disposed in an intake duct of a reciprocating engine upstream from the cylinder intake valve and the movable valve element is moveable independent of movement of the cylinder intake valve.

12. A method for reducing a valve opening time duration and a valve closing time duration of a valve, the valve comprising a valve element movably disposed within a valve body, wherein a fluid flow passage is at least partially defined by the valve body and the movable valve element, the fluid flow passage having a minimum effective cross-sectional area when the valve element is disposed in a valve closed position and a maximum effective cross-sectional area when the valve element is disposed in a valve open position, the method comprising:

moving the valve element from the valve closed position via a first movement range, a second movement range and a third movement range to the valve open position, wherein a ratio of a change of the effective cross-sectional area of the fluid flow passage to movement distance of the valve element is smaller during the first and third movement ranges than during the second movement range, wherein said ratio during the first and third movement ranges is zero or substantially zero.

13. A method as in claim 12, wherein the movement of the valve member during the first and third movement ranges is accelerated both when the valve member is moving from the valve closed position to the valve open position and when the valve member is moving from the valve open position to the valve closed position.

14. A method as in claim 13, wherein the valve element linearly reciprocates within the valve body.

15. A method as in claim 13, wherein the valve element pivots about a point within the valve body.

16. A method as in claim 12, wherein the movement of the valve member during the first and third movement ranges is accelerated both when the valve member is moving from the valve closed position to the valve open position and when the valve member is moving from the valve open position to the valve closed position.

17. A valve, comprising:

a valve body having an inner wall, and a valve element disposed within the valve body and being movable between a valve closed position and a valve open position, wherein a fluid flow passage is at least partially defined by the valve body and the movable valve element, the fluid flow passage having a minimum effective cross-sectional area when the valve element is disposed in the valve closed position and a maximum effective cross-sectional area when the valve element is disposed in the valve opening position, wherein the valve element is movable from the valve closed position via a first movement range, a second movement range and a third movement range to the valve closed position, and the valve element and the fluid flow passage are arranged and constructed such that a ratio of a change of the effective cross-sectional area of the fluid flow passage to movement distance of the valve element is smaller during the first and third movement ranges than the second movement range, wherein said ratio during the first and third movement ranges is zero or substantially zero.

18. A valve as in claim 17, wherein the valve element is biased to an intermediate position between the valve open position and the valve closed position, and wherein the valve further comprises electromagnets arranged and constructed to retain the valve element in the valve open position and the valve closed position.

19. A valve as in claim 17, wherein the valve member is linearly movably mounted on a flow body fixed within the fluid flow passage such that the fluid flow passage has a ring-shaped cross-section, the valve member is cap-shaped and is arranged and constructed such that the outer surface of the valve member is flush with the outer surface of the flow body when the valve member is disposed in the valve open position, a first ring-shaped protrusion is defined on the outer surface of the flow body so as to surround a circumferential edge surface of the valve member when the valve member is disposed within the third movement range and the valve open position, and a first ring-shaped protrusion is defined within the fluid flow passage so as to surround the circumferential edge surface of the valve member when the valve member is disposed within the first movement range and the valve closed position.

20. A valve as in claim 19, further comprising first and second springs arranged and constructed to bias the valve element towards an intermediate position between the valve open position and the valve closed position.

21. A valve as in claim 20, further comprising a first electromagnet arranged and constructed to retain the valve element in the valve open position against the biasing force of the springs and a second electromagnet arranged and constructed to retain the valve element in the valve closed position against the biasing force of the springs.

22. A valve as in claim 17, wherein the valve member is defined as a flap that is rotatably mounted to a first wall of the fluid flow passage, a first shoulder is formed on the first wall so as to correspond to a terminal edge of the valve member when the valve member is disposed within the third movement range and the valve open position, and a second shoulder is formed on a second wall of the fluid flow passage so as to correspond to the terminal edge of the valve member when the valve member is disposed within the first movement range and the valve closed position.

23. A reciprocating engine comprising:

a cylinder intake valve reciprocally disposed within a cylinder, and an intake duct arranged and constructed to supply fresh air to the cylinder, the valve of claim 17 being disposed in the intake duct upstream of the cylinder intake valve.

24. A reciprocating engine comprising:

a cylinder intake valve reciprocally disposed within a cylinder, and an intake duct arranged and constructed to supply fresh air to the cylinder, the valve of claim 21 being disposed in the intake duct upstream of the cylinder intake valve.

* * * * *

UNITED STATES PATENT AND TRADEMARK OFFICE
CERTIFICATE OF CORRECTION

PATENT NO. : 6,892,997 B2
DATED : May 17, 2005
INVENTOR(S) : Kreuter, Peter

It is certified that error appears in the above-identified patent and that said Letters Patent is hereby corrected as shown below:

Column 8,
Line 15, "closed" should be -- open --.

Signed and Sealed this

Seventh Day of February, 2006

JON W. DUDAS
*Director of the United States Patent and Trademark Office*